United States Patent
Dufour

Patent Number: 5,192,035
Date of Patent: Mar. 9, 1993

[54] RETRACTOR WITH MANUAL CINCH

[75] Inventor: William T. Dufour, Sterling Heights, Mich.

[73] Assignee: TRW Vehicle Safety Systems Inc., Lyndhurst, Ohio

[21] Appl. No.: 796,913

[22] Filed: Nov. 22, 1991

Related U.S. Application Data

[63] Continuation of Ser. No. 574,750, Aug. 29, 1990, abandoned.

[51] Int. Cl.⁵ ............................................. B65H 75/48
[52] U.S. Cl. ............................................. 242/107.4 R
[58] Field of Search ......... 242/107, 107.4 R, 107.4 A; 280/806, 807; 200/61.58 B

[56] References Cited

U.S. PATENT DOCUMENTS

| | | | |
|---|---|---|---|
| 3,913,860 | 10/1975 | Takada, deceased | 200/61.58 B |
| 3,915,402 | 10/1975 | Takada, deceased | 242/107.4 R |
| 3,944,163 | 3/1976 | Hayashi et al. | 242/107.4 R |
| 4,304,373 | 12/1981 | Nishimura | 242/107.4 A |
| 4,327,882 | 5/1982 | Frankila et al. | 242/107.4 A |
| 4,402,473 | 9/1983 | Kubota et al. | 242/107.4 A |
| 4,427,164 | 1/1984 | Rumpf | 242/107.4 R |
| 4,428,545 | 1/1984 | Naitoh | 242/107.4 A |
| 4,573,646 | 3/1986 | Willey | 22/107.4 A |
| 4,583,701 | 4/1986 | Matsui et al. | 242/107.4 A |
| 4,726,539 | 2/1988 | Schmidt et al. | 242/107.4 A |
| 4,729,524 | 3/1988 | Befort et al. | 242/107.4 R |
| 4,767,082 | 8/1988 | Schmidt et al. | 242/107.4 A |

*Primary Examiner*—Daniel P. Stodola
*Assistant Examiner*—John P. Darling
*Attorney, Agent, or Firm*—Tarolli, Sundheim & Covell

[57] ABSTRACT

A vehicle seat belt retractor has a manual cinch mechanism. The retractor includes a spool on which belt webbing is wound. It also includes a metal pawl which is movable into a locking position in engagement with a spool locking ratchet wheel to block the spool against rotation in the belt withdrawal direction. A pawl actuator is movable between a first position and a second position to move the pawl into its locking position. A manually movable member such as a push button can move the pawl actuator into its second position and thereby move the metal pawl into its locking position. When the pawl actuator has been moved into its second position by the manually movable member, an overcenter spring acts to keep the pawl actuator in its second position, holding the metal pawl in its locking position. The overcenter spring can act on the pawl only through the pawl actuator. Thus, the overcenter spring can hold the pawl in its locking position only when the pawl actuator is intentionally moved into its second position by the manually movable member.

14 Claims, 3 Drawing Sheets

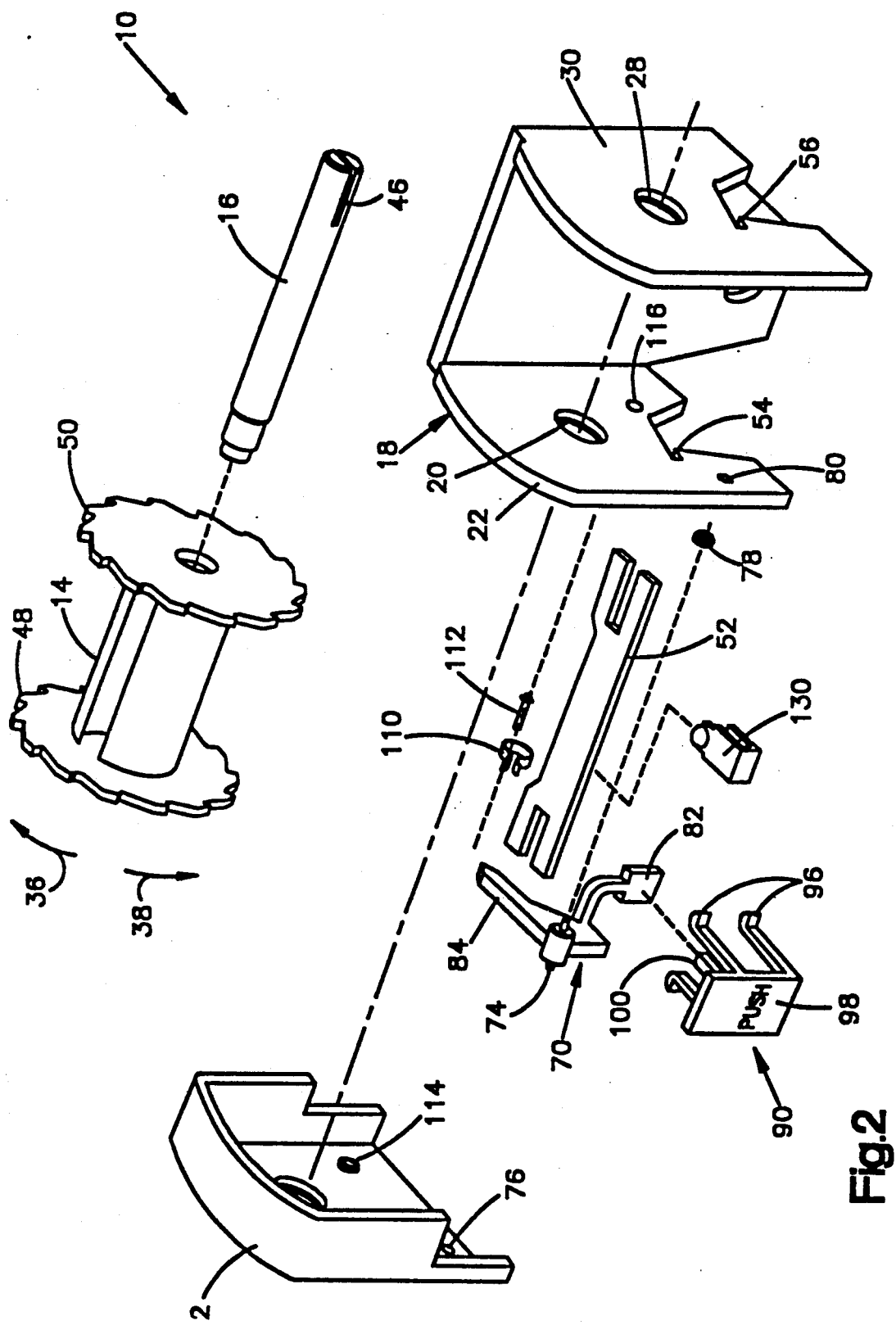

RETRACTOR WITH MANUAL CINCH

This is a continuation of copending application Ser. No. 07/574,750 filed on Aug. 29, 1990, now abandoned.

BACKGROUND OF THE INVENTION

1. Technical Field

The present invention relates to a seat belt retractor for a vehicle. More particularly, the present invention relates to a seat belt retractor having a manual cinch mechanism for blocking seat belt withdrawal on demand by a vehicle occupant.

2. Description of the Prior Art

A vehicle seat belt retractor holds a vehicle occupant in a seat by blocking withdrawal of seat belt webbing from the retractor when the seat belt is buckled around the occupant. Some seat belt retractors are constructed to allow an occupant to buckle the seat belt and still be able to move around in the seat. These retractors include an emergency locking mechanism for blocking withdrawal of the seat belt in an emergency.

Notwithstanding the provision of an emergency locking mechanism in a retractor, some seat belt retractors include a manual "cinch" mechanism, by which a vehicle occupant can manually lock the retractor to block further belt withdrawal. U.S. Pat. No. 4,427,164 shows a seat belt retractor with a manual cinch mechanism actuated by a push button. When the push button is actuated, a locking pawl engages a spool locking ratchet wheel. An overcenter spring attached to the locking pawl holds the pawl in engagement with the spool locking ratchet wheel, blocking rotation of the spool in the belt withdrawal direction.

Retractors incorporating the cinch mechanism shown in U.S. Pat. No. 4,427,164 can unintentionally engage the cinch mechanism when the vehicle passes over rough surfaces. The locking pawl is metal in order to withstand locking loads. It also has enough inertia that under certain road conditions, it can unintentionally pivot against the bias of the overcenter spring into engagement with the spool locking ratchet wheel. The overcenter spring then holds the pawl in engagement with the spool locking ratchet wheel, blocking belt withdrawal and possibly causing occupant discomfort, at a time when the vehicle occupant did not intend to actuate the cinch mechanism. The cinch mechanism can only be disengaged by unbuckling the belt or by opening a vehicle door, both of which actions are unsafe when driving.

SUMMARY OF THE INVENTION

The present invention is a vehicle seat belt retractor with a manual cinch mechanism. The retractor includes a spool on which seat belt webbing is wound. The spool is rotatable in belt withdrawal and belt retraction directions. At least one spool locking ratchet wheel is fixed to the spool for rotation with the spool. In a vehicle emergency, a locking pawl moves into a locking position in engagement with the spool locking ratchet wheel to lock the spool locking ratchet wheel and the spool against rotation in the belt withdrawal direction.

The spool can also be locked manually. A pawl actuator is movable from a first position to a second position to move the pawl into its locking position. A manually movable member, such as a push button, can engage the pawl actuator to move the pawl actuator into its second position and thereby move the pawl into its locking position. When the pawl actuator has been moved into its second position by the manually movable member, an overcenter spring acts on the pawl actuator to keep the pawl actuator in its second position, thus holding the pawl in its locking position.

The pawl actuator can be moved into its second position only by an intentional action of the vehicle occupant. The pawl actuator is light in weight and cannot move against the bias of the overcenter spring. Thus, the overcenter spring holds the pawl in its locking position only when the pawl actuator is intentionally moved into its second position by the vehicle occupant. It is possible for the locking pawl to pivot unintentionally into engagement with the spool locking ratchet wheel. In such a circumstance, however, the pawl is free to pivot out of engagement with the spool locking ratchet wheel because the overcenter spring is not then acting on the pawl. Accordingly, unintentional retractor lockup is prevented as the overcenter spring acts on the light weight pawl actuator and not directly on the pawl.

BRIEF DESCRIPTION OF THE DRAWINGS

Further features of the present invention will become apparent to those skilled in the art to which the present invention relates from reading the following specification with reference to the accompanying drawings, in which:

FIG. 2 is an exploded perspective view of the retractor of FIG. 1 with parts removed;

DESCRIPTION OF PREFERRED EMBODIMENT

Figure 1:
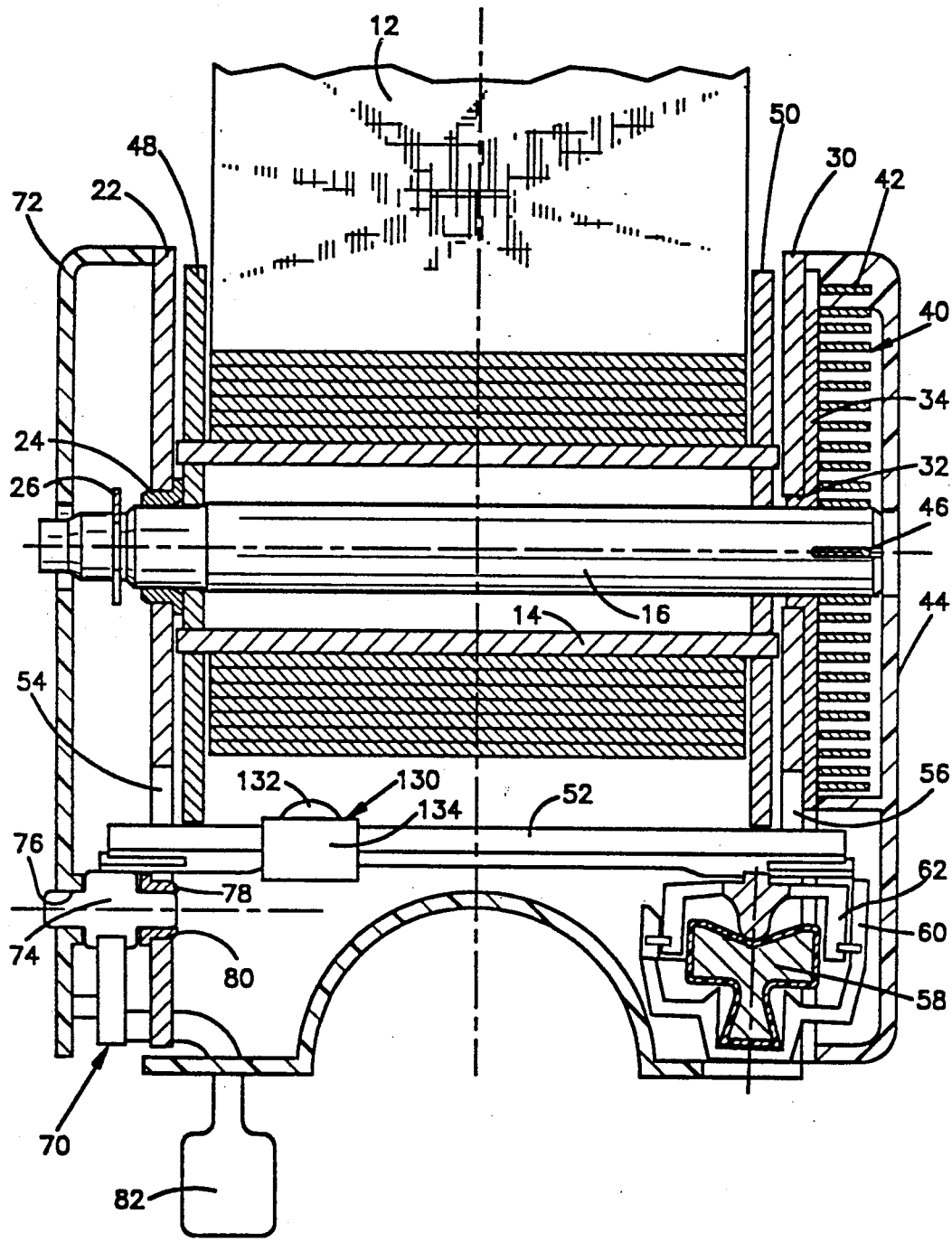
FIG. 1 is a transverse view partially in section of a seat belt retractor embodying the present invention.

A vehicle seat belt retractor 10 (FIGS. 1 and 2) has a length of seat belt webbing 12 wound on a spool 14. The spool 14 is fixed to a shaft 16 and is rotatable with the shaft 16 in a retractor frame 18 secured to the vehicle. One end of the shaft 16 extends through an opening 20 in one frame side 22 and is supported there on a bearing 24. A retainer 26 limits axial movement of the shaft 16. The opposite end of the shaft 16 extends through an opening 28 in the other frame side 30, and is supported on a bearing portion 32 of a support plate 34 fixed to the frame side 30.

The spool 14 is rotatable in a belt retraction direction 36 and a belt withdrawal direction 38. A coil spring 40 biases the spool 14 to rotate in the belt retraction direction 36. An outer end 42 of the spring 40 is received in a slot in a cover 44 fixed to the frame 18. An inner end of the spring 40 is received in a slot 46 in one end of the shaft 16. The spring 40 acts through the shaft 16 to bias the spool 14 in the belt retraction direction 36.

A pair of spool locking ratchet wheels 48 and 50 are fixed to the spool 14 and rotate with the spool 14. A locking pawl 52, preferably made of metal, is supported for pivotal movement in openings 54 and 56 of the retractor frame 18. The pawl 52 is pivotable into engagement with the spool locking ratchet wheels 48 and 50 to block rotation of the spool 14 in the belt withdrawal direction 38.

An inertia mass 58 is supported in a housing 60 fixed to the frame 18. An inertia lever 62 is pivotally mounted to the housing 60 and is engaged by the inertia mass 58. Upon vehicle deceleration at a rate above a predetermined rate, the inertia mass 58 moves relative to the retractor frame 18, pivoting the inertia lever 62 to move the locking pawl 52. The locking pawl 52 moves into engagement with the spool locking ratchet wheels 48 and 50, blocking further withdrawal of belt webbing 12.

To provide a manual cinch capability, the retractor 10 includes a pawl actuator 70. Movement of the pawl actuator 70 moves the pawl 52 into engagement with the spool locking ratchet wheels 40 and 50 to block rotation of the spool 14 in the belt withdrawal direction 38. The pawl actuator 70 is mounted for pivotal movement between the frame side 22 (FIG. 1) and a retractor side cover 72. The pawl actuator 70 includes a pivot pin 74, one end of which is received in an opening 76 in the cover 72. The other end of the pin 74 is received in a bearing 78 in an opening 80 in the frame side 22. The pawl actuator 70 has a first lever arm 82 extending downwardly from the pivot pin 74. A second lever arm 84 extends laterally from the pivot pin 74, approximately perpendicular to the first lever arm 82.

Figure 3:
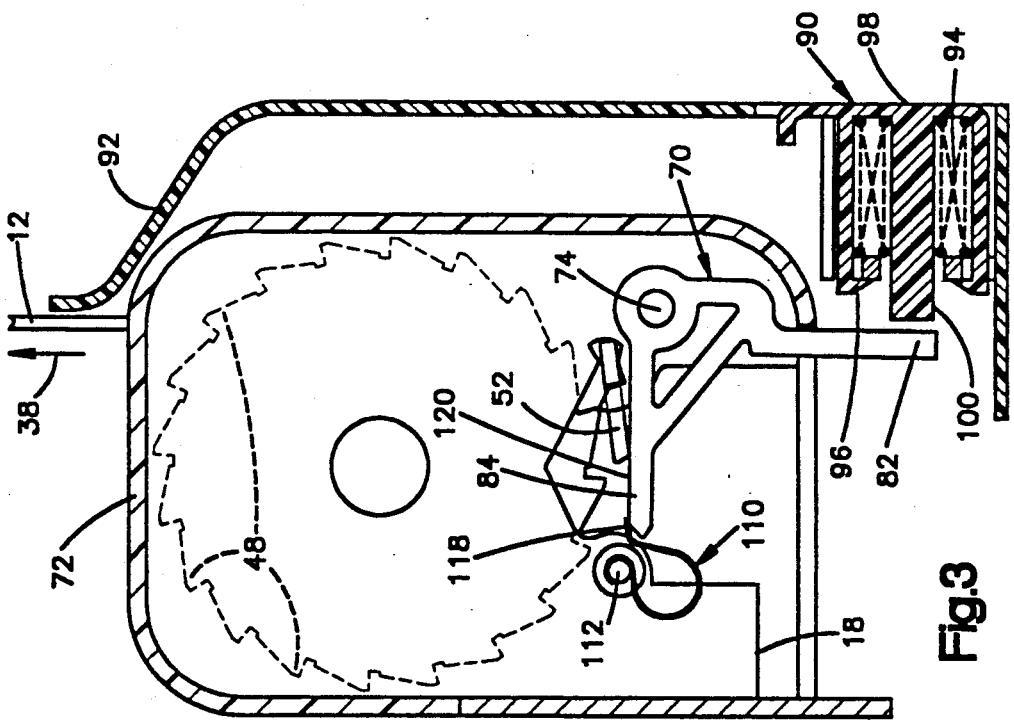
FIG. 3 is a side view partially in section of the retractor of FIG. 1 showing the pawl actuator in its first position and the locking pawl out of engagement with the spool locking ratchet wheel.

An end portion of the locking pawl 52 rests on the second lever arm 84 of the pawl actuator 70. When the pawl actuator 70 is in a first position as illustrated in FIG. 3, the pawl 52 is spaced from the spool locking ratchet wheels. In this position, the spool 14 can rotate in the belt withdrawal direction. When the pawl actuator 70 is in a second position as viewed in FIG. 4, the second lever arm 84 of the pawl actuator 70 moves the pawl 52 into engagement with the spool locking ratchet wheels, blocking rotation of the spool 14 in the belt withdrawal direction 38.

Figure 4:
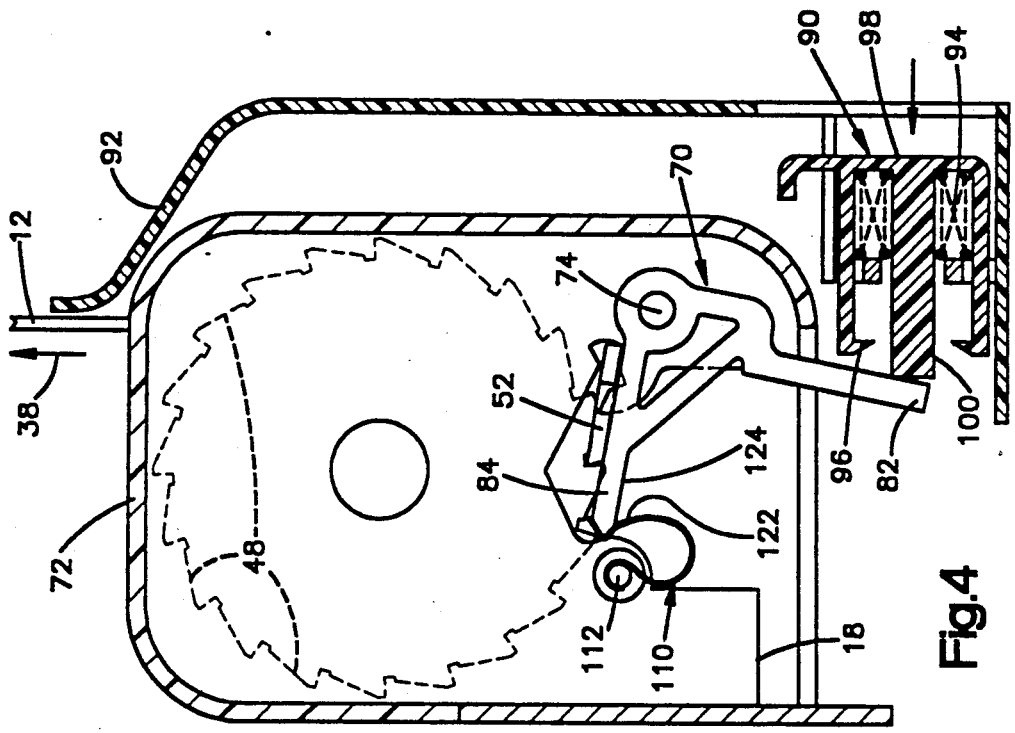
FIG. 4 is a view similar to FIG. 3 showing the pawl actuator in its second position and the overcenter spring holding the locking pawl in its locking position.

The pawl actuator 70 is movable between its first and second positions by a manually movable member which in the preferred embodiment is a push button 90 (FIGS. 3 and 4). The push button 90 is mounted for sliding movement on a retractor trim cover 92 fixed to the vehicle. A spring 94 biases the push button 90 outwardly away from the first lever arm 82 of the pawl actuator 70. Catch members 96 on the push button 90 limit outward movement of the push button 90.

The push button 90 has a face surface 98 against which a vehicle occupant can push to move the push button 90 inwardly against the bias of the spring 94. When the push button 90 is pushed in (FIG. 4), a post 100 on the push button 90 engages the first lever arm 82 of the pawl actuator 70. The pawl actuator 70 is pivoted from its first position shown in FIG. 3 to its second position shown in FIG. 4. The second lever arm 84 of the pawl actuator 70 moves the locking pawl 52 into its locking position in engagement with the spool locking ratchet wheels 48 and 50. When the push button 90 is released, the spring 94 moves the push button 90 away from the first lever arm 82 of the pawl actuator 70 and back to the position shown in FIG. 3.

An overcenter spring 110 biases the pawl actuator 70 into either its first position or its second position. The overcenter spring 110 is mounted by a spring mounting pin 112 to the retractor 10. The mounting pin 112 has its outward end received in a boss 114 (FIG. 2) in the retractor side cover 72. The inward end of the mounting pin 112 is received in an opening 116 in the frame side 22.

When the pawl actuator 70 is in its first position as viewed in FIG. 3, a first portion 118 of the overcenter spring 110 engages a first surface 120 of the pawl actuator 70. With the overcenter spring 110 and pawl actuator 70 in this position, the overcenter spring 110 holds the pawl actuator 70 in its first position, and the pawl actuator 70 does not move the pawl 52 into engagement with the spool locking ratchet wheels.

When the pawl actuator 70 is in its second position as viewed in FIG. 4, a second portion 122 of the overcenter spring 110 engages a second surface 124 of the pawl actuator 70. With the overcenter spring 110 and pawl actuator 70 in this position, the pawl actuator 70 is held in its second position by the overcenter spring 110. The pawl actuator 70 holds the locking pawl 52 in engagement with the spool locking ratchet wheels 48 and 50, thus blocking rotation of the spool 14 in the belt withdrawal direction 38 as desired.

The overcenter spring 110 acts on the pawl 52 only through the pawl actuator 70. Also, the pawl actuator 70 can be moved into its second position only by intentional action of the vehicle occupant. Thus, the overcenter spring 110 can hold the pawl 52 in its locking position only when the pawl actuator 70 is intentionally moved into its second position by the manually movable member 90. Accordingly, if the locking pawl 52 should unintentionally pivot into engagement with the spool locking ratchet wheels, as a result of a shock to the retractor from a rough road surface, the locking pawl 52 is free to pivot out of engagement with the spool locking ratchet wheels because the overcenter spring 110 is not acting on the pawl 52. Further, the pawl actuator 70 is lightweight and preferably made of plastic. Thus, the overcenter spring 110 is capable of holding the pawl actuator 70 in position to prevent the pawl actuator 70 from unintentionally moving the locking pawl 52. Therefore, unintentional lockup of the retractor 10 is prevented since the overcenter spring 110 acts on the pawl actuator 70 and not directly on the pawl 52.

The pawl 52 is movable out of its locking position in response to retraction of belt webbing 12 in excess of a predetermined amount. A web sensor 130 is mounted on the pawl 52. The web sensor 130 has a contact portion 132 engageable with the belt webbing 12 and a clip portion 134 by which the web sensor 130 is attached to the pawl 52. When more than a predetermined amount of belt webbing 12 is wound on the spool 14, the diameter of the wound belt webbing 12 is large enough to engage the contact portion 132 of the web sensor, moving the pawl 52 out of its locking position. As the pawl 52 moves out of its locking position, it also moves the pawl actuator 70 back to its first position as viewed in FIG. 3. Thus, when the vehicle seat belt is unbuckled and allowed to retract a sufficient amount, the cinch mechanism is released and the spool 14 is again free to rotate in the belt withdrawal direction 38.

From the above description of the invention, those skilled in the art will perceive improvements, changes and modifications. Such improvements, changes and modifications within the skill of the art are intended to be covered by the appended claims.

I claim:
1. A vehicle seat belt retractor comprising:
   a spool on which seat belt webbing is wound and which is rotatable in belt withdrawal and belt retraction directions;
   at least one spool locking ratchet wheel fixed to said spool for rotation therewith;
   a pawl movable into a locking position in engagement with said spool locking ratchet wheel to lock said spool locking ratchet wheel and said spool against rotation in the belt withdrawal direction;

a pawl actuator movable relative to said pawl between a first position and a second position to move said pawl into its locking position;

a manually movable member for engaging said pawl actuator to move said pawl actuator into its second position; and biasing means directly engaging said pawl actuator and spaced from said pawl, said biasing means biasing said pawl actuator into its first position when said pawl actuator is in its first position and biasing said pawl actuator into its second position when said pawl actuator is in its second position.

2. An apparatus as defined in claim 1 wherein said biasing means comprises an overcenter spring having a first portion for engaging a first surface of said pawl actuator to bias said pawl actuator into its first position, said overcenter spring having a second portion for engaging a second surface of said pawl actuator to bias said pawl actuator into its second position when said pawl actuator is moved into its second position by said manually movable member.

3. An apparatus as defined in claim 1 wherein said pawl actuator comprises a lever mounted for pivotal movement between said first position and said second position, said lever having a first lever arm for engagement by said manually movable member and a second lever arm for engagement by said pawl.

4. An apparatus as defined in claim 1 wherein said pawl actuator weighs less than said pawl.

5. An apparatus as defined in claim 4 wherein said pawl actuator is made of plastic and said pawl is made of metal.

6. An apparatus as defined in claim 1 wherein said pawl actuator comprises a lever mounted on said frame for pivotal movement between said first position and said second position, said lever having a first lever arm for engagement by said manually movable member and a second lever arm for engagement by said pawl, said biasing means comprising an overcenter spring having a first portion for engaging a first surface of said second lever arm to bias said lever into its first position, said overcenter spring having a second portion for engaging a second surface of said second lever arm to bias said lever into its second position when said lever is moved into its second position by said manually movable member.

7. An apparatus as defined in claim 6 wherein said manually movable member comprises a push button mounted for movement relative to said first lever arm, and further comprising means for biasing said push button away from said first lever arm.

8. An apparatus as defined in claim 6 further including means for moving said pawl out of its locking position in response to retraction of belt webbing in excess of a predetermined amount.

9. An apparatus as defined in claim 8 wherein said means for moving said pawl comprises a web sensor having a first portion engageable with the belt webbing wound on said spool and a second portion attached to said pawl, said first portion of said web sensor engaging said belt webbing to move said pawl out of its locking position when more than a predetermined amount of webbing is wound on said spool.

10. A vehicle seat belt retractor comprising:

a spool on which seat belt webbing is wound and which is rotatable in belt withdrawal and belt retraction directions;

at least one spool locking ratchet wheel fixed to said spool for rotation therewith;

a metal pawl movable into a locking position in engagement with said spool locking ratchet wheel to lock said spool locking ratchet wheel and said spool against rotation in the belt withdrawal direction;

a plastic pawl actuator movable between a first position and a second position to move said metal pawl into its locking position;

a manually movable member for engaging said pawl actuator to move said pawl actuator into its second position; and an overcenter spring directly engaging said pawl actuator and spaced from said pawl, said overcenter spring biasing said pawl actuator into its first position when said pawl actuator is in its first position and biasing said pawl actuator into its second position when said pawl actuator is moved into its second position by said manually movable member.

11. An apparatus as defined in claim 10 wherein said pawl actuator comprises a lever mounted for pivotal movement between said first position and said second position, said lever having a first lever arm for engagement by said manually movable member and a second lever arm for engagement by said pawl.

12. An apparatus as defined in claim 11 wherein said manually movable member comprises a push button mounted for movement relative to said first lever arm, and further comprising means for biasing said push button away from said first lever arm.

13. An apparatus as defined in claim 10 further including mean for moving said pawl out of its locking position in response to retraction of belt webbing in excess of a predetermined amount.

14. A vehicle seat belt retractor comprising:

a spool on which seat belt webbing is wound and which is rotatable in belt withdrawal and belt retraction directions;

at least one spool locking ratchet wheel fixed to said spool for rotation therewith;

a pawl movable into a locking position in engagement with said spool locking ratchet wheel to lock said spool locking ratchet wheel and said spool against rotation in the belt withdrawal direction;

a pawl actuator member movable relative to said pawl between a first position and a second position to move said pawl into its locking position;

a manually movable member for engaging said pawl actuator member to move said pawl actuator member into its second position; and biasing means acting on one of said pawl actuator member and said manually movable member and spaced from said pawl, said biasing means biasing said pawl actuator member into its first position when said pawl actuator member is in its first position and biasing said pawl actuator member into its second position when said pawl actuator member is in its second position.

* * * * *